UNITED STATES PATENT OFFICE.

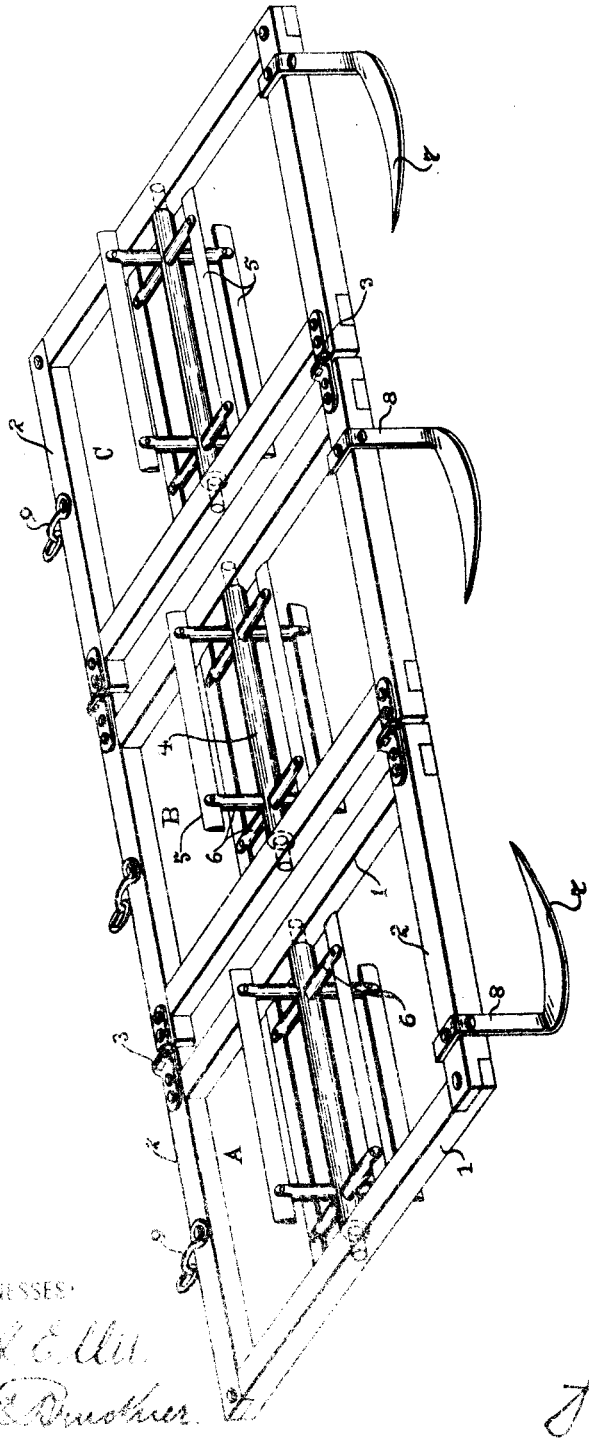

LUCIUS S. EVANS, OF BALLINGER, TEXAS, ASSIGNOR TO WALTER EVANS, OF BOWIE, TEXAS, J. E. EVANS, OF COOPER, TEXAS, AND LEE EVANS, OF BALLINGER, TEXAS.

MULTIPLE-SECTION STALK-CUTTER.

1,182,154. Specification of Letters Patent. Patented May 9, 1916.

Application filed March 5, 1914. Serial No. 822,601.

*To all whom it may concern:*

Be it known that I, LUCIUS S. EVANS, a citizen of the United States, residing at Ballinger, in the county of Runnels and State of Texas, have invented certain new and useful Improvements in Multiple-Section Stalk-Cutters, of which the following is a specification.

My invention relates to a new and useful multiple-section stalk cutter.

It is the object of my invention to provide a stalk cutter that will operate upon a plurality of rows simultaneously, being formed of flexibly connected sections that will allow the implement to accommodate itself to wavy or uneven ground.

It is another object of the invention to provide a stalk cutter that is especially adapted for use in conjunction with a drag harrow, the harrow serving to bare the stalks of limbs and burs, while the stalk cutter, following, will cut the stalks into small pieces.

It is a further object of the invention to provide a stalk cutter that will cut the stalks level with the ground leaving no stubble.

A still further object of the invention is to provide a device of the character described that will be strong, durable, efficient and simple and comparatively inexpensive to produce, also one in which the several parts will not be likely to get out of working order.

With the above and other objects in view, the invention has relation to certain novel features of construction and operation, an example of which is described in the following specification and illustrated in the accompanying drawings, wherein the drawing constitutes an isometric view of a three section stalk cutter embodying the novel features of my invention, the various parts of the implement being indicated in said drawing by suitable reference characters to be hereinafter used.

The three sections which comprise the form of my stalk cutter exemplified in the drawing are respectively indicated by the letters A, B and C. Each section is provided with a rectangular frame comprising a pair of elongated members 1, parallel to the direction of travel of the stalk cutter, and a pair of parallel members 2 rigidly connecting the extremities of the parts 1. The members 2 of each section will be flexibly connected by hinges 3 with the same members of the next adjacent section. In each of said rectangular frames, there is mounted a revoluble member comprising a shaft 4 having its extremities respectively journaled in the members 1 of the correlated frame, and a plurality of blades 5 held in a parallel spaced relation to said shaft by pairs of arms 6 rigidly projecting from the end portions of the shaft.

To the rear member 2 of each section, there is rigidly secured a curved blade 7 extending substantially parallel to the blades 5 and connected rigidly with the correlated member 2 by a vertical shank 8 integral with said blade. Upon the forward member 2 of each section there is mounted a bracket 9 which serves to attach the stalk cutter to the rear of a drag harrow, in conjunction with which it is preferred to use the stalk cutter.

In the use of my implement, each section of the same will travel along a row of stalks from which the drag harrow with which the stalk cutter is correlated will strip the limbs and burs. Said harrow furthermore in conjunction with the front bars 2 of the stalk cutter will bend the stalks to the ground parallel to the direction of travel of the implement. The blades 5, to which rotation will be communicated by the travel of the stalk cutter will come into contact with the stalks at short space intervals, and will cut the same into small fragments which later will be quickly decomposed. The blades 7 following the main cutting members will trim off the stubble of the stalks flush with the surface of the ground.

While my stalk cutter has been specified as particularly adapted for use in conjunction with a drag harrow, it is to be understood that the implement is not limited to use in such a combination, and under some conditions may be used alone with excellent results.

The invention is presented as including all such modifications and changes as properly come within the scope of the following claim.

What I claim is:

In a device of the class described, a frame; draft means assembled with the forward end of the frame; a rotary blade-carrying member extended transversely of the line of advance of the frame and journaled in the frame; and a blade depending from the rear end of the frame, said blade extending transversely of the line of advance of the frame and being disposed substantially parallel to the surface of the ground; the blade-carrying member constituting the sole support whereon the frame is mounted to tilt to vary the distance between the rear blade and the ground, and the rear blade constituting the sole means for limiting the tilting of the frame with respect to the ground.

In testimony whereof I have signed my name to this specification in the presence of two subscribing witnesses.

LUCIUS S. EVANS.

Witnesses:
H. M. JOSEY,
T. J. GARDNER.